M. CUMMINS.
COUPLING FOR GRINDING AND POLISHING WHEELS.
APPLICATION FILED OCT. 30, 1908.
962,627.
Patented June 28, 1910.
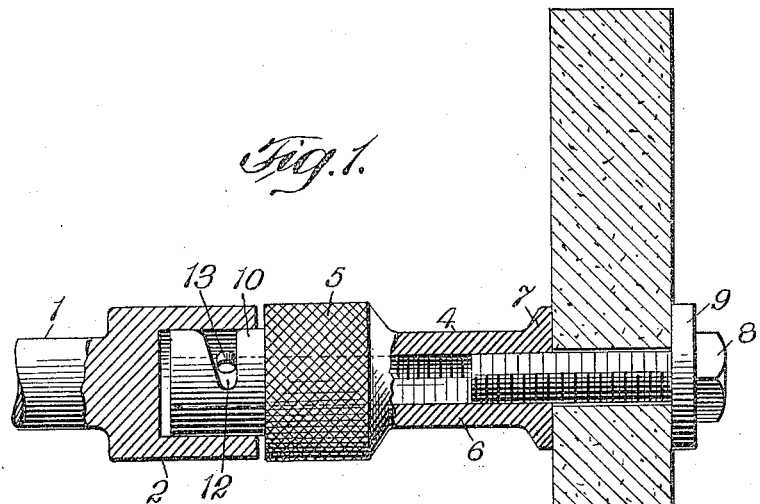
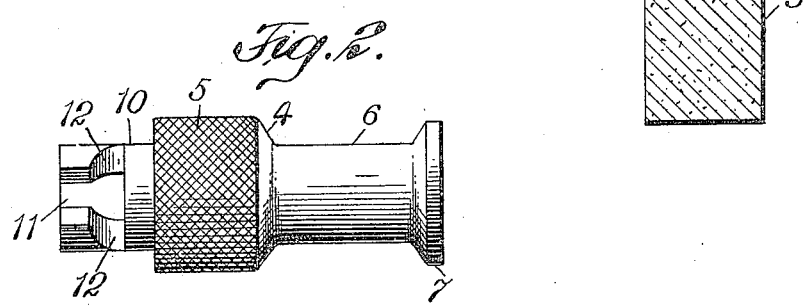
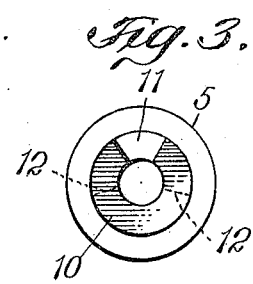
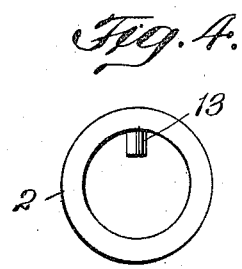
WITNESSES
INVENTOR
Michael Cummins
BY
Criswell & Criswell
ATTORNEYS

UNITED STATES PATENT OFFICE.

MICHAEL CUMMINS, OF BERGENFIELD, NEW JERSEY.

COUPLING FOR GRINDING AND POLISHING WHEELS.

962,627.  Specification of Letters Patent. Patented June 28, 1910.

Application filed October 30, 1908. Serial No. 460,236.

*To all whom it may concern:*

Be it known that I, MICHAEL CUMMINS, a citizen of the United States, and a resident of Bergenfield, county of Bergen, and State of New Jersey, have invented certain new and useful Improvements in Clutches or Couplings for Grinding and Polishing Wheels, of which the following is a full, clear, and exact description.

This invention relates to devices for connecting a wheel or object which is adapted to be rotated rapidly with its driving shaft, and for quickly and easily attaching and detaching the wheel to its shaft.

The invention has special reference to clutches or couplings for detachably connecting rotary brushes, and buffing, grinding or polishing wheels to the driving shaft, especially such as are used by jewelers and others.

The primary object of the invention is to provide such a device which is simple in construction, and by means of which a wheel may be quickly attached to and detached from its driving shaft.

A further object of the invention is to provide a simple and efficient coupling which may be used in connection with various rotary bodies.

The invention will be hereinafter more particularly described with reference to the accompanying drawings, which form a part of this specification, and will then be pointed out in the claim at the end of the description.

In the drawings, Figure 1 is a view in elevation, and partly in vertical section, of a grinding or polishing wheel connected to a driving shaft by a coupling constructed in accordance with this invention. Fig. 2 is a detail side view of one of the coupling members constructed in accordance with this invention. Fig. 3 is an end view of the device shown in Fig. 2. Fig. 4 is an end view of the driving shaft and other coupling member.

Referring to the accompanying drawings, 1 is a driving shaft or spindle provided with a cylindrical hollow head 2 forming a clutch or coupling member which is integral with the shaft 1, and 3 is a grinding or polishing wheel connected to the coupling member 2 by means of a coupling member 4. The coupling member 4, which is constructed in accordance with this invention, consists of an enlarged central portion 5 formed with a bur or milled portions adapting the coupling member to be turned with the fingers, and having a spool-like extension 6 formed with a flange 7 at its outer end adapted to bear against the wheel 3. The wheel 3 is secured to the coupling member 4 by means of a screw bolt 8 and a washer 9, said bolt having its threaded body engaging a threaded aperture in the extension 6. The coupling member 4 is further provided with a cylindrical portion 10 having a longitudinal opening or slot 11 in its periphery and lateral circumferential slots 12 which are substantially V-shaped having one side inclined and communicating with said longitudinal opening 11. This coupling member 4 is connected to the head or member 2 of the shaft 1 in any suitable manner and as here shown is connected by means of a pin 13 projecting inwardly from the inner portion of the head or member 2 and adapted to engage one of the lateral slots 12 in the portion 10 of the coupling member 4. The member 4 and the head or member 2 of the shaft are connected together by pushing the cylindrical portion 10 into the cylindrical head 2, the longitudinal opening 11 permitting the portion 10 to pass the pin 13, and after the latter is opposite the slots 12 by turning the member 4, the cylindrical portion 10 is brought into locking engagement with the pin 13. By operating the member 4 in the opposite manner from that described, said member may be withdrawn from the head 2, and the wheel 3 thereby detached from the shaft 1, and while the portion 5 is shown separated from the outer face of the member 2, the relative movement between the members 2 and 4 are such that these surfaces will rest against each other.

It will be seen that by means of this invention a wheel or other body can be quickly and readily attached to and detached from a rotary shaft by a short turn of the coupling device. The inclined walls of the slots 12 acting against the pin 13 draw the adjacent shouldered end of the enlarged portion 5 against the end of the hollow head 2 of the shaft. It will also be seen that by having the coupling formed with a longitudinal opening or slot 11 and transverse slots 12 communicating therewith the coupling member 4 may be turned on the end of the shaft in either direction either to lock it to the shaft or to release it therefrom, and that the wheel or object will be locked against removal when rotated in either direction, and can be removed only when the pin 13 is in alinement with the slot or opening 11.

It will be understood that the head or member 2 may be independent of the shaft 1 instead of integral therewith, and the wheel member may be constructed as the female member instead of male.

Having thus described my invention, I claim as new and desire to secure by Letters Patent:—

A coupling, comprising a shaft having a hollow head provided with a pin projecting inwardly therefrom, a second member adapted to be connected at one end to a wheel and having at its other end a cylindrical projection provided with a longitudinal passageway in its periphery, and circumferential slots connected with said longitudinal passageway, whereby said second member may be rotated and interlocked with the first-mentioned member, said slots each having an inclined wall.

This specification signed and witnessed this 28th day of October A. D. 1908.

MICHAEL CUMMINS.

Witnesses:
W. A. TOWNER, Jr.,
A. REDMOND.